United States Patent [19]
Adcock et al.

[11] 3,892,839
[45] July 1, 1975

[54] PROCESS FOR FORMING NITROSYL TETRAFLUOROBORATE

[75] Inventors: James L. Adcock, Cambridge; Richard J. Lagow, Manchester, both of Mass.

[73] Assignee: Massachusetts Institute of Technology, Cambridge, Mass.

[22] Filed: Mar. 6, 1974

[21] Appl. No.: 448,717

[52] U.S. Cl. .................................. 423/277; 423/386
[51] Int. Cl. ............................................. C01b 35/00
[58] Field of Search ............................. 423/277, 386

[56] References Cited
UNITED STATES PATENTS
3,306,834   2/1967   Fox et al. ......................... 423/386 X
3,375,084   3/1968   Kuhn ................................. 423/277

FOREIGN PATENTS OR APPLICATIONS
708,526   4/1965   Canada

OTHER PUBLICATIONS
Chemical Abstracts; Vol. 21, 1927, p. 1235.
Chemical Abstracts; Vol. 66, 1967, p. 117492 v.

Primary Examiner—G. O. Peters
Attorney, Agent, or Firm—Arthur A. Smith, Jr.; Paul J. Cook; Martin M. Santa

[57] ABSTRACT

Nitrosyl tetrafluoroborate is formed according to the equation:

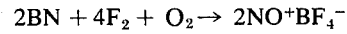

$$2BN + 4F_2 + O_2 \rightarrow 2NO^+BF_4^-$$

employing either heat or ultraviolet radiation as the reaction energy source.

4 Claims, No Drawings

PROCESS FOR FORMING NITROSYL TETRAFLUOROBORATE

BACKGROUND OF THE INVENTION

This invention was made in the course of work performed under contract with the National Science Foundation and under a contract with the Department of the Army.

This invention relates to a process for forming nitrosyl tetrafluoroborate.

Nitrosyl tetrafluoroborate presently is used in organic synthesis as a convenient source of nitrosyl ions used in diazotation and as nitrosating agents. Nitrosyl tetrafluoroborate is formed by reacting nitrosyl chloride, hydrogen fluoride, and boron trifluoride in a solvent such as sulphur dioxide at a temperature of between about −15° and −30°C. Unfortunately, this process has substantial disadvantages. For example nitrosyl chloride and boron trifluoride are relatively expensive reagents and therefore their use is undesirable. More importantly, the process is undesirable since it forms by-product hydrogen chloride which must be removed from the nitrosyl tetrafluoroborate prior to use as a diazotation or nitrosating agent. Furthermore, the process is undesirable since it requires the use of a solvent which increases the cost of the process both from the standpoint of the cost of the solvent and the cost of the step of separating the nitrosyl tetrafluoroborate from the solvent. Accordingly, it would be highly desirable to provide a process of forming nitrosyl tetrafluoroborate without the use of a solvent, with inexpensive reagents and without the formation of by-products from which the nitrosyl tetrafluoroborate must be removed prior to ultimate use thereof.

SUMMARY OF THE INVENTION

The present invention is based upon the discovery that nitrosyl tetrafluoroborate can be formed from boron nitride, fluorine gas, and oxygen gas in the absence of water while employing heat or ultraviolet radiation as the source of energy for the reaction. The reaction of the present invention can be carried out in the absence of a solvent without the formation of undesirable by-products and is exemplified by the following equation:

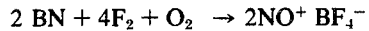

$$2\ BN + 4F_2 + O_2 \rightarrow 2NO^+\ BF_4^-$$

The energy for the reaction is supplied either by heat or ultraviolet radiation.

DESCRIPTION OF SPECIFIC EMBODIMENTS

Generally the reaction as carried out in a reactor containing boron nitride powder through which is passed fluorine gas and oxygen gas at controlled flow rates. It is necessary to conduct the reaction in the substantial absence of water since water and fluorine react to form $OF_2$ and hydrogen fluoride. Hydrogen fluoride decomposes the product. To assure that there is a substantial absence of water during the reaction, the boron nitride is heated under vacuum, e.g. about 600°C for a period of time sufficient to dehydrate the powder. In addition, the fluorine and oxygen gases are passed through an alkali metal fluoride trap in order to remove hydrogen fluoride, prior to entering the reactor.

It has been found that the yield of nitrosyl tetrafluoroborate is maximized when regulating the ratio of the flow rates of fluorine and oxygen. For a given flow rate of fluorine, when the flow rate of oxygen is too high, dilution of the reactants occurs and thereby seriously reduces the reaction rate. On the other hand, when the relative flow rate of oxygen is too low, undesirable boron trifluoride is formed as a by-product which causes a severe reduction in yield of nitrosyl tetrafluoroborate. It has been found that the yield of nitrosyl tetrafluoroborate is maximized when the molar flow rate of oxygen is maintained between about 25 and about 30 percent of the flow rate of fluorine to maintain a mole ratio of fluorine gas to oxygen gas of between about 4:1 and 3:1.

The reaction can be conducted with either heat or ultraviolet radiation as the source of energy. It is preferred to employ a source of ultraviolet radiation as the energy for the reaction since nitrosyl tetrafluoroborate are greatly increased as compared with the use of heat as the source of energy. Any conventional source of ultraviolet radiation such as mercury vapor lamps, or the like can be employed in the present reaction. When the reaction is conducted with ultraviolet radiation as the source of reaction energy, the reaction can be conducted at room temperature. When heat is employed at atmospheric pressure, the reaction is conducted at a temperature between about 40° and about 100°C, preferably between about 50° and 60° in order to maximize the yield of nitrosyl tetrafluoroborate. On the other hand, when the reaction is conducted in a bomb reactor, the temperatures employed are between about 50° and about 300°C while employing a pressure of up to about 10 atmospheres. In the process of this invention, the least preferred embodiment is when the reactants merely are heated at atmospheric pressure without ultraviolet radiation. It has been found that operating in this manner a yield of only about 10 percent, based upon the boron nitride is obtained. On the other hand, when employing ultraviolet radiation, preferably under pressure, the yields obtained are up to about 90 percent based upon boron nitride. When employing heat and pressure to effect reaction, the yield intermediate that set forth above is obtained.

It is to be noted that even when the ratio of oxygen to fluorine is outside that of preferred mole ratios, the process of this invention still is advantageous over that of the prior art since the gaseous boron trifluoride obtained is easily separated from the solidified reaction products.

Generally, the reaction is conducted for a period of time to assure substantial conversion of the boron nitride to the nitrosyl tetrafluoroborate. The time necessary to effect the reaction will depend upon the amount of boron nitride employed as a starting material and the configuration of the boron nitride in the reactor which is preferably such that to assure intimate mixing of the boron nitride and the fluorine and oxygen.

The oxygen reactant can be pure oxygen or a mixture of oxygen and inert gases such as in air. However, it is preferred to employ pure oxygen as the reactant gas since the presence of inert gases causes a reduction in the mean free path and a desirable increase in reaction rate.

The process of this invention provides substantial advantages over the prior art processes since boron nitride and fluorine are less expensive reagents than nitrosyl chloride and boron trifluoride. In addition no solvent is required. Most importantly, the reaction can be conducted without forming undesirable by-products.

The following examples illustrate the present invention and are not intended to limit the same.

EXAMPLE I

In a quartz reactor was placed boron nitride powder which had passed through a 325 mesh sieve. The powder was heated under vacuum in the reactor to approximately 600° for five minutes to remove water therefrom and then the boron nitride was allowed to cool to room temperature. The quartz reactor then was purged with helium for about one half hour at a helium flow rate of 155 cc/min. Thereafter, mercury vapor lamps were lighted to expose the interior of the reactor to ultraviolet radiation and fluorine and oxygen flow were initiated into the reactor to expose the interior of the reactor to ultraviolet radiation and fluorine and oxygen flow were initiated into the reactor at respective flow rates of 12.0 cc/min and 3.0 cc/min. The reaction was allowed to proceed at room temperature for seven days to insure complete reaction. A test of the exhausted gas for boron trifluoride showed a minor concentration of boron trifluoride which was completely eliminated by increasing the oxygen flow rate to 3.5 to 4.0 cc/min. The yields obtained are nearly quantitive.

Analysis of the reaction product with no further purification gave the following results: Calculated for $NO^+BF_4^-$: B, 9.25%; N, 12.0%; F, 65.1: Found: B, 10.48; N, 10.50; F, 61.43.

The x-ray powder pattern (Cu radiation) of the $NO^+BF_4^-$ contained d lines at 3.50, 3.13, 2.82, 2.25, 4.40, 2.50, 2.09 and 5.50 in agreement with the reported lines in the powder diffraction file. The infrared spectra contained a peak at 2320 (Nujol mull) or 2310 cm$^{-1}$ (Fluorolube mull) due to the $NO^+$ ion. The tetrafluoroborate ion was identified by its characteristic absorption pattern of 1045 cm$^{-1}$ and weaker bands at 495, 510, and 1290 cm$^{-1}$. The $F^{19}$ N.M.R. resonance of the tetrafluoroborate ion was observed at + 147.2 r.p.m. relative to $CFCl_3$ in acetontrile solution. The mass spectrum of the compounds contained peaks corresponding to $BF_3$ at m/e 68, $BF_2$ and NOF at 49, and NO and BF at 30. The isotope ratio of $B^{10}$ to $B^{11}$ indicates that both species are present as indicated.

EXAMPLE II

A 0.120 gm. sample of boron nitride (325 mesh) was dried at −600°C in vacuo for 0.5 hours in an open nickel container. The container and boron nitride were placed in a quartz reactor tube and flushed with oxygen (100 cc/min, 1 hour). A flow of 12.0 cc/min fluorine and 3.0 cc/min oxygen then was initiated and the mercury vapor lamps were activated. The reaction was stopped after 65 hours. The quartz reaction tube then was flushed with helium (100 cc/min, 1 hour). A yield of 0.132 g. (23.2%) $NO^+BF_4^-$ was obtained. The product was identified by x-ray powder diffraction, infrared, $^{19}F$ nmr and mass spectra.

EXAMPLE III

This example illustrates that the reaction can be initiated and maintained with heat and without ultraviolet radiation. A 0.56 g sample of boron-nitride (325 mesh) was placed in a nickel reactor tube surrounded by heating coils. The tube was purged with oxygen gas (100 cc/min, 1 hr.) and then flows of 12.0 cc/min fluorine and 3.5 cc/min oxygen were initiated into the tube and the tube was warmed to 50°C. After 24 hours the reaction was stopped, the reactor flushed with helium (100 cc/min, 1 hr.), cooled, sealed and carried into the dry box. A yield of 0.13 g $NO^+BF_4^-$ was isolated along with unreacted boron nitride. This reaction is initiated at temperatures as low as 40°C but as the temperature is increased losses also increase due to dissociation of $NO^+BF_4^-$.

EXAMPLE IV

This example illustrates that the reaction can be effected with heating under pressure without ultraviolet radiation. A 0.5 g (.020 moles) of boron-nitride (325 mesh) was placed in a prefluorinated nickel autoclave (1 liter capacity) and pressurized 80 psi. The autoclave then was heated to 100°C for 24 hrs. The pressure in the system dropped to about 70 psi overnight. Upon cooling the excess pressure was bled off and the system purged with helium (100 cc/min, 12 hrs.). A yield of 1.5 g (70 percent) of primarily $NO^+BF_4^-$ was isolated. In addition small amounts of $NO_2^+BF_4^-$ could be detected by x-ray powder diffraction.

| Characterization: $NO^+BF_4^-$ | | |
|---|---|---|
| Elemental Analysis: | Calculated | %B 9.25, %N 12.0, %F 65.1 |
| | Found | %B 10.48, %N 10.50, %F 61.43 |
| X-ray Diffraction: | "d" lines 3.50, 3.13, 2.82, 2.25, 4.40, 2.50, 2.09 and 5.50. | |
| Infrared: $NO^+$ | 2320 cm$^{-1}$ (Nujol Mull) | |
| | 2310 cm$^{-1}$ (Fluorolube mull) | |
| $BF_4^-$ | 1045 cm$^{-1}$, smaller peaks at 495, 510 and 1290 cm$^{-1}$. | |
| Also | $^{19}F$ nmr of $BF_4^-$ in $CH_3CN$ (acetonitrile) | |
| | $\phi = +147.2$ ppn vs $CFCl_3$ external | |
| Mass Spectra: | $BF_3$ at m/e 68 | |
| | $BF_2$ + NOF at m/e 49 | |
| | NO + BF at m/e 30. | |

We claim:

1. The process for forming nitrosyl tetrafluoroborate which comprises reacting, in the substantial absence of water, boron nitride, oxygen gas and fluorine gas wherein the energy for the reaction is provided either by ultraviolet light or by heat.

2. The process of claim 1 wherein the reaction is conducted by exposing the reactants to ultraviolet radiation.

3. The process of claim 1 wherein the mole ratio of fluorine to oxygen gas is maintained between about 4:1 and about 3:1.

4. The process of claim 2 wherein the mole ratio of fluorine to oxygen gas is maintained between about 4:1 and about 3:1.

* * * * *